(12) United States Patent
Boyd et al.

(10) Patent No.: US 6,180,068 B1
(45) Date of Patent: *Jan. 30, 2001

(54) INTERBED GAS-LIQUID MIXING SYSTEM FOR COCURRENT DOWNFLOW REACTORS

(75) Inventors: Sherri L. Boyd, Robbinsville, NJ (US); Gregory P. Muldowney, Glen Mills, PA (US)

(73) Assignee: Mobil Oil Corporation, Fairfax, VA (US)

(*) Notice: Under 35 U.S.C. 154(b), the term of this patent shall be extended for 0 days.

This patent is subject to a terminal disclaimer.

(21) Appl. No.: 09/311,395

(22) Filed: May 13, 1999

Related U.S. Application Data

(63) Continuation-in-part of application No. 08/984,199, filed on Dec. 3, 1997, now Pat. No. 5,935,413.

(51) Int. Cl.[7] ............................... B01J 8/02; B01J 8/04
(52) U.S. Cl. .................... 422/195; 194/220; 194/215; 194/191
(58) Field of Search ..................... 422/195, 194, 422/220, 191, 215, 207; 261/108, 113

(56) References Cited

U.S. PATENT DOCUMENTS 3,353,924 * 11/1967 Riopelle .
4,836,989   6/1989 Aly et al. ........................... 422/195
5,462,719  10/1995 Pedersen et al. .................. 422/195
5,935,413 *  8/1999 Boyd et al. ........................... 208/49

* cited by examiner

Primary Examiner—Marian C. Knode
Assistant Examiner—Susan Ohorodnik
(74) Attorney, Agent, or Firm—Malcolm D. Keen

(57) ABSTRACT

An apparatus for mixing vapor and liquid reactants within a column. The apparatus forms a first mixing zone into which a first reactant (e.g. vapor) is homogenized by swirl flow and flows vertically downward. The apparatus further forms a second mixing zone into which a second reactant (e.g., liquid) is homogenized by swirl flow and flows vertically downward. Additional amounts of either the first reactant, the second reactant or both may be added into or ahead of the first mixing zone or the second mixing zone as appropriate. The first reactant is directed radially to collide in crossflow with a thin sheet of the second reactant to provide intense mixing of the first and second reactants. Due to separate mixing zones for the two reactants, the mixing conditions for each can be tailored to best mix each reactant while minimizing pressure drop and minimizing the space and volume requirements for this mixing.

10 Claims, 4 Drawing Sheets

INTERBED GAS-LIQUID MIXING SYSTEM FOR COCURRENT DOWNFLOW REACTORS

CROSS-REFERENCE TO RELATED APPLICATIONS

This application is a continuation-in-part, filed under 37 C.F.R. 53(b)(2), of application Ser. No. 08/984,199, filed Dec. 3, 1997, now U.S. Pat. No. 5,935,413.

FIELD OF THE INVENTION

This invention is directed to interbed quench and mixing of process gases and liquids in cocurrent downflow reactors using fixed hardware.

BACKGROUND

In fixed-bed fuels and lube hydroprocessing units, gas and liquid flow downward through multiple beds of solid catalyst. Heat is released from the catalytic reactions causing temperature to increase with distance down the bed. Cool hydrogen-rich gas is introduced between the beds to quench the temperature rise and replenish the hydrogen consumed by the reactions. Three requirements of an effective quench zone are transverse gas mixing, transverse liquid mixing, and quench gas mixing. The introduction and mixing of quench into the process gas and liquid must be carried out in the interbed space which spans the full vessel diameter, but is often shorter than one vessel radius. Support beams, piping and other obstructions also occupy the interbed region so that unique hardware is required to perform efficient two-phase mixing in what amounts to limited volume.

Poor quench zone performance manifests itself in two ways. First, the quench zone fails to erase lateral temperature differences at the outlet of the preceding bed or, in the worst cases, amplifies them. An effective quench zone should be able to accept process fluids with 50 to 75° F. lateral temperature differences or higher and homogenize them sufficiently that differences do not exceed 5° F. at the following bed inlet. The second sign of poor performance is that inlet temperature differences following the quench zone increase as the rate of quench gas is raised. This indicates inadequate mixing of cooler gas with the hot process fluids.

Inadequate quench zone performance limits reactor operation in various ways. When interbed mixing in unable to erase temperature differences, these persist or grow as the process fluids move down the reactor. Hot spots in any bed lead to rapid deactivation of the catalyst in that region which shortens the total reactor cycle length. Product selectivities are typically poorer at high temperatures; hot regions can cause color, viscosity and other qualities to be off-specification. Also, if the temperature at any point exceeds a certain value (typically 800 to 850° F.), the exothermic reactions may become self-accelerating leading to a runaway which can damage the catalyst, the vessel, or downstream equipment. Cognizant of these hazards, refiners operating with poor internal hardware must sacrifice yield or throughput to avoid these temperature limitations. With present day refinery economics dictating that hydroprocessing units operate at feed rates far exceeding design, optimum quench zone design is a valuable low-cost debottleneck.

In U.S. Pat. No. 4,836,989 is described a method for quench zone design. The essential feature of this design is the rotational flow created in the mixing volume which increases fluid residence time and provides repeated contacting of liquid and gas from different sides of the reactor. This design is keyed to liquid mixing. More recent studies have shown it to be only a fair gas mixer. The trend to higher conversion and higher hydrogen circulation in fuels refining translates to gas/liquid ratios for this design is not well suited. Height constrained units cannot be fitted with mixing chambers of the type described in this patent that are deep enough to effectively mix both the gas and liquid phases.

A new interbed mixing system described in U.S. Pat. No. 5,462,719 offers some improvements over the design described above when gas mixing is paramount. This hardware is based again on a swirl chamber, but also includes at least three highly restrictive flow elements to enhance mixing, which necessarily increase pressure drop. Like the previously described system, this quench zone mixes the gas and liquid at once in a single chamber.

SUMMARY

The present invention provides a novel means to provide more effective mixing of quench gas and process fluids in a very-height constrained interbed space while not increasing pressure drop. The present invention embodies one or more of seven features, as follows.

1. Two separate swirl chambers are used to mix gas and liquid. Effective swirl-flow gas mixing requires a confining diameter smaller than that for liquid due to the much lower density of the gas relative to the liquid. In addition, the typically higher gas velocity is wasted accelerating the liquid, with no added mixing benefit, if the gas and liquid phases enter any confinement concurrently. Mixing is more effective if each phase is internally homogenized first, particularly since, despite lateral temperature differences, the average temperatures of the gas and liquid phases are usually very close. Separate gas and liquid chambers effectively partition the total mixing requirement into two disproportionately smaller tasks. The most space-efficient arrangement is for the gas and liquid swirl chambers to be concentric with the liquid chamber surrounding the gas chamber, although other constructions are possible.

2. Entrance to the gas swirl chamber is substantially tangential. Rotational flow in the gas is induced by forcing the flow through ducts or baffles which enter the swirl chamber at an angle less than 60 degrees from the tangential direction. The entrances are typically rectangular openings rather than narrow slots, and extend minimally into the swirl volume, although they may have significant approach length (possibly as much as one (1) swirl chamber diameter). The entering flow is substantially horizontal as this results in the maximum number of rotations in the swirl chamber. The gas entrances may take the form of many evenly spaced baffles or as few as two (2) opposing ducts. Fewer entrances provide more pre-mixing of gas approaching the chamber, but increase pressure drop.

3. Entrance to the liquid swirl chamber is substantially tangential. Rotational flow in the liquid is induced by forcing the flow through ducts or baffles, preferably only two (2) to four (4). Whereas the gas entrances create rotational flow by their orientation, the liquid entrances do so by their location close to the outer wall of the swirl chamber. Liquid entrances are oriented less than forty-five (45) degrees from horizontal, and preferably do not project into the swirl chamber at all, thus minimizing any disturbance to the rotation in the chamber and maximizing liquid swirling time.

4. Quench fluid is injected into or upstream of the swirl chamber of like phase. Gas quench is injected directly into the gas swirl chamber or into the process gas before entering. Liquid quench may be injected into the liquid swirl chamber, but is preferably mixed with the process liquid before entering. In either case, where quench enters the chamber directly, it is injected in a way which minimally disturbs the rotational flow, that is along the swirl axis or into the top or bottom of the chamber with a compatible swirl already established. Mixed-phase quench is preferably introduced upstream of both swirl chambers.

5. Exit from the gas chamber is against a stagnation-point surface. The outlet of the gas swirl chamber may feature various minor constrictions or steps to enhance swirling, but the final discharge is perpendicular against a flat surface which forces the gas into a thin outward-flowing sheet. The surface may be roughened or fitted with small objects to promote turbulence in the gas.

6. Exit from the liquid chamber is over a central circular weir and in the form of a thin sheet. A weir having a height between five (5) and ninety-five (95) percent of the liquid swirl chamber height is necessary to provide liquid holdup in the chamber. The weir is preferably concentric with a cylindrical surface of slightly smaller diameter extending downward from the ceiling of the chamber, such that the liquid exits through a narrow annular gap. This geometry meters flow out of the chamber without retarding the rotational flow, and forms a thin sheet to promote the subsequent interphase mixing step.

7. Gas and liquid exiting their respective chambers meet in crossflow at high velocity. Upon exiting the swirl chambers, the gas and liquid are each internally well-mixed. Mixing between the phases is accomplished by directing the stagnation-point gas flow perpendicularly into the liquid sheet, which atomizes the liquid on contact. Atomization creates ample surface area to minimize any difference between the well-mixed liquid temperature and the well-mixed gas temperature, and enhances dissolution of fresh hydrogen into the liquid phase. The volume immediately downstream of the gas-liquid contacting point may be fitted with various types of baffles or turbulence-promoting objects to further enhance intermixing of the phases.

In a preferred embodiment, the invention provides for a mixing zone for a reactor column, the mixing zone comprising a horizontal divider plate extending radially across the reactor column, the divider plate having an upper surface and a lower surface and having an opening therethrough; a first cylindrical baffle mounted on the upper surface of the divider plate and encircling the opening through the divider plate, the cylindrical baffle having a plurality of entrance ports located along the circumference of the cylindrical baffle, wherein the lower edges of the entrance ports are raised above the divider plate; a cover plate extending radially across the top of the first cylindrical baffle to thereby prevent substantially downward flow in or out of the top of the first cylindrical baffle; a second cylindrical baffle mounted on the lower surface of the divider plate, and together with the first cylindrical baffle defining a first cylindrical volume in which the effective radius may vary over the height of the volume; a third cylindrical baffle mounted on the lower surface of the divider plate; a horizontal bottom plate extending radially inward from the bottom edge of the third cylindrical baffle, the bottom plate having an upper surface and a lower surface and having a opening therethrough; a fourth cylindrical baffle mounted on or above the upper surface of the bottom plate inside the third cylindrical baffle, and together with the third cylindrical baffle and the bottom plate defining a second cylindrical volume in which the effective radius may vary over the height of the volume, the second cylindrical volume being distinct and nonoverlapping with the first cylindrical volume; at least one spillway through the divider plate having an approach conduit above the divider plate and a fluid passage through the divider plate, the approach conduit and the fluid passage together providing a liquid flow path from above the divider plate into the second cylindrical volume in a direction which is tangential relative to the third cylindrical baffle and at a minimal downward angle into the second cylindrical volume, and further wherein the approach conduit does not project into the second cylindrical volume, so as to create rotational flow in the second cylindrical volume; and at least one flow restriction means in the fourth cylindrical baffle and/or formed by the relative positions of at least two of the fourth cylindrical baffle, the second cylindrical baffle, the divider plate, and the bottom plate, the flow restriction means having a cross-sectional area less than or equal to the total area of the spillway fluid passages through the divider plate and providing a flow path for liquid out of the second cylindrical volume.

A more preferred embodiment is one in which the first cylindrical volume is substantially coaxial with the second cylindrical volume and the first cylindrical volume terminates at a horizontal plane located at approximately the same elevation as the bottom plate of the second cylindrical volume.

The mixing apparatus may further comprise a deflector surface located below the bottom plate upon which vapor flowing through the first cylindrical volume will impinge to direct the vapor substantially radially outward toward the periphery of the column, and wherein the flow restriction means from the second cylindrical volume provides at least one liquid flow path of narrow width and large perimeter to produce a thin liquid sheet at the fourth cylindrical baffle, and wherein the deflector surface extends to a radius at least equal to that of the fourth cylindrical baffle to insure substantially perpendicular collision of the vapor with the thin liquid sheet.

In an alternative embodiment of the vapor-liquid mixing section, the mixing apparatus may be configured such that the bottom plate projects radially into the first cylindrical volume, and wherein the flow restriction means from the second cylindrical volume is provided by a narrow spacing between the bottom plate and the bottom edge of the second cylindrical baffle to produce a thin liquid sheet, and wherein the thin liquid sheet is directed substantially horizontally into the vapor flowing through the first cylindrical volume to insure substantially perpendicular collision of the vapor with the thin liquid sheet.

DRAWINGS

DETAILED DESCRIPTION

Figure 1:
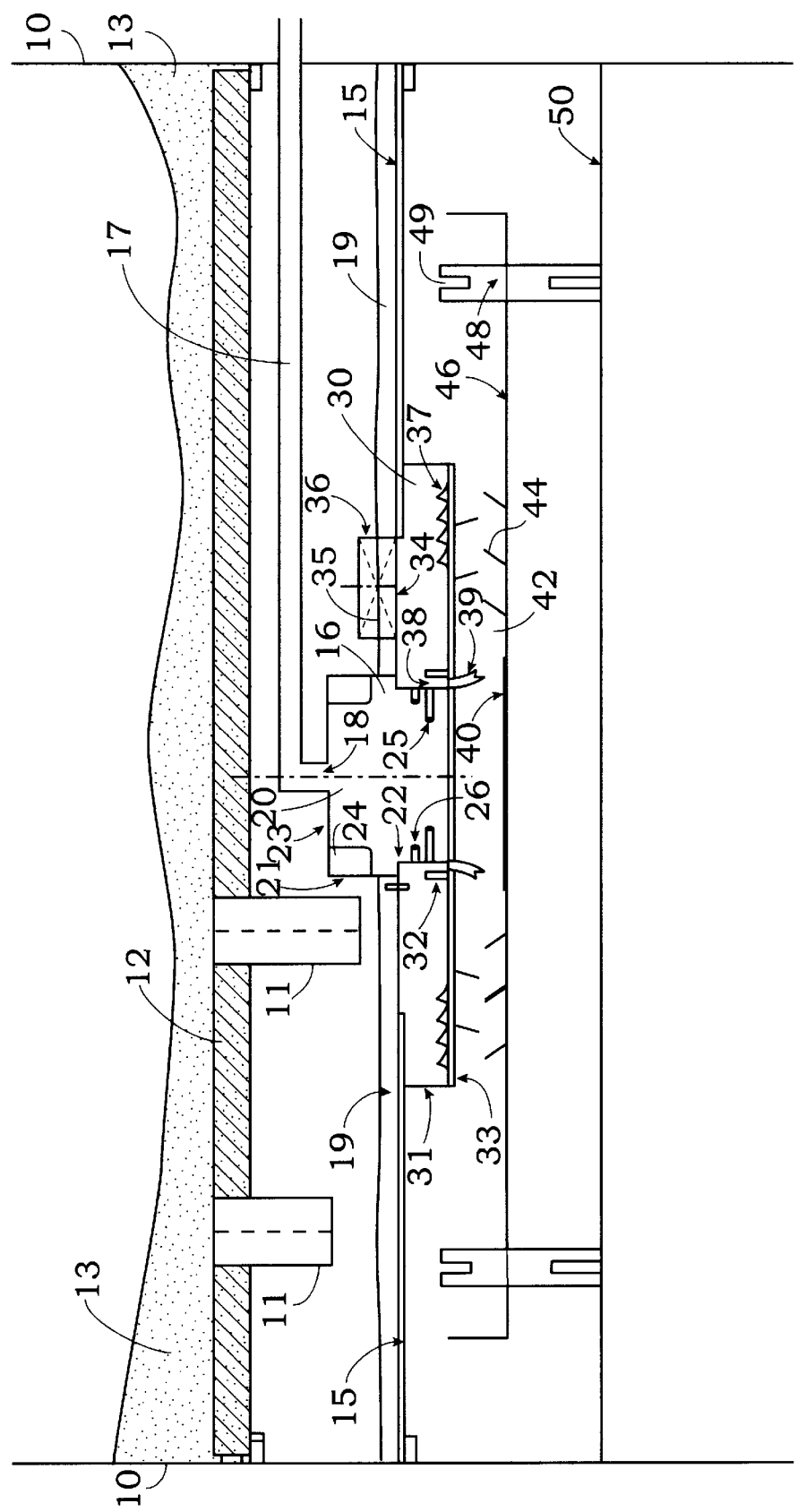
FIG. 1 is a vertical section of a portion of a multiple bed reactor showing the distribution system of the present invention.

FIG. 1 shows in simplified form a section through a portion of a multiple bed, downflow reactor in the region between the beds. The general configuration of the downflow reactor will be conventional, as will details such as the mechanical supports 11 for the internal grids and distributor plates. In most locations the supports 11 are not shown for purposes of clarity. The walls 10 of the reactor, and the support grid 12, together retain an upper bed 13 of catalyst or other particulate material through which vapor and liquid reactants flow, together with vapor and liquid products of the reaction. Thus there are generally two fluid phases present throughout the bed 13. The support grid 12 may be of a conventional type and provides support for the catalyst either directly or by retaining one or more layers of larger supporting solids which in turn support the catalyst and permit the liquid and vapor to flow downwardly out of the upper bed through the grid to the distributor system beneath.

A divider plate 15 is disposed radially across the reactor column beneath the support grid 12 to collect the liquid leaving the upper catalyst bed 13 and allow disengagement of the vapor and liquid phases. On the upper surface of the divider plate 15 is located a first cylindrical baffle 21 having a plurality of entrance ports 24 therethrough and encircling an opening 16 through the divider plate 15. A cover plate 23 extends radially across the top of the cylindrical baffle 21 to enclose a cylindrical space. On the lower surface of the divider plate 15 is located a second cylindrical baffle 22 coaxial with the first cylindrical baffle 21 encircling the opening 16 from below. The total volume enclosed by the first cylindrical baffle 21, second cylindrical baffle 22, and cover plate 23 constitutes the vapor mixing chamber 20, within which the radius may vary with height, for example if the cylindrical baffles are mildly conical in shape. The vapor passing through the support grid 12 and collecting above the divider plate 15 enters the vapor mixing chamber 20 though the ports 24 located in the circumference of the first cylindrical baffle 21. The ports 24 may be rectangular openings rather than narrow slots and may extend minimally into the swirl volume of the vapor mixing chamber 20. Alternately, they may have a significant length of approach conduit or duct, for example as much as one (1) vapor mixing chamber diameter. The ports 24 are also raised above the divider plate 15 to prevent passage of liquid into the ports 24 from the standing pool of liquid 19 which forms on the divider plate 15. The ports 24 may be shaped by vanes which may be oriented at any angle up to 60 degrees, and preferably 45 degrees, to a line projected tangent to the surface of the vapor mixing chamber 20 at the edge of the port 24 nearest to the vane. The vapor is mixed by intense swirl flow in the vapor mixing chamber 20, which may be enhanced by the presence of small projections or baffles 25 in the mixing chamber 20, while simultaneously passing through the opening 16 in the divider plate 15. Upon exiting the region of the second cylindrical baffle 22 the vapor impinges on a deflector surface 40 located below the divider plate 15 which forces the vapor to pass radially outward from the vapor mixing chamber 20.

Vapor injection, such as quench gas, may be directed into any location between the support grid 12 and the divider plate 15, or into the vapor mixing chamber 20. For example, in a hydroprocessing reactor such as a catalytic hydrodesulfurization unit, hydrogen may be injected as quench at this point. The vapor injection means 17 forms no part of the invention. A possible injection means is shown in FIG. 1 consisting of a hole 18 through the cover plate 23 of the vapor mixing chamber 20 with the injected vapor piped directly thereto. Other vapor injection devices, such as manifolds or deflectors to disperse the vapor radially, may also be provided for this purpose. It is also possible to withdraw vapor between the support grid 12 and the divider plate 15 by means of similar devices.

At least one spillway 35 is provided in the divider plate 15 to permit a pool of liquid 19 to collect on the divider plate 15 before passing through the spillway into the liquid mixing chamber 30 beneath the divider plate. The spillway 35 comprises an upstanding approach conduit 36 on the upper surface of the divider plate 15 which directs liquid through an entrance port 34, the approach conduit 36 oriented tangentially with respect to the liquid mixing chamber 30 in order to create a rotational flow of liquid in the mixing chamber 30. To maximize the intensity of swirl flow the spillway 35 does not project into the liquid mixing chamber 30 and the approach conduit 36 is angled into the entrance port 34 with the minimum departure possible from horizontal. The liquid mixing chamber 30 comprises a third cylindrical baffle 31 which is connected to the lower side of the divider plate 15, a bottom plate 33 extending radially inward from the third cylindrical baffle 31, and a fourth cylindrical baffle 32 mounted on or above the bottom plate 33 and projecting substantially upward towards the divider plate 15. The liquid mixing chamber 30 may be fitted with small baffles or projections 37 to induce local turbulence in the liquid as it swirls. The relative positions of at least two of the second cylindrical baffle 22, fourth cylindrical baffle 32, divider plate 15, and bottom plate 33 define a restricted outlet for liquid 38 which forces the liquid to exit liquid mixing chamber 30 as a thin liquid sheet 39 in a substantially downward direction. The restricted outlet may alternatively be achieved by slots or apertures in the fourth cylindrical baffle 32.

A stream of auxiliary liquid, such as a liquid quench, may be introduced into the pool of liquid 19 on the divider plate 15, or injected directly into the spillway 35 or the liquid mixing chamber 30. Injection into the mixing chamber is preferably accomplished using a device comprising an approach conduit located entirely outside the liquid mixing chamber 30 which does not project into the liquid mixing chamber 30.

Below the bottom plate 33 is located the deflector surface 40 which is disposed radially across the reactor column and oriented such that vapor exiting the vapor mixing chamber 20 will impinge on the deflector surface 40 and be directed radially outward toward the periphery of the reactor column through the sheet of liquid 39 exiting from the liquid mixing chamber 30. The flow of vapor passing through the liquid sheet 39 atomizes the liquid, thus creating ample surface area to erase differences between the temperatures of the well-mixed liquid exiting the liquid mixing chamber 30 and the well-mixed vapor exiting the vapor mixing chamber 20, and further enhances dissolution of vapor-phase reactants into the liquid phase. The space 42 between the bottom plate 33 and the deflector surface 40 may be fitted with small baffles or projections to further promote turbulence and shear, thereby enhancing heat and mass transfer between the phases.

An alternative arrangement to achieve crossflow of the vapor and liquid is to allow the bottom plate 33 to extend beneath the lower edge of the second cylindrical baffle 22, forming a continuation of the restricted outlet 38 which directs the liquid from liquid mixing chamber 30 horizontally into the vapor flowing downward in the vapor mixing chamber 20. This arrangement atomizes the liquid effectively and is suitable for applications where the resulting two-phase mixture can be discharged substantially vertically downward with no subsequent passage through or across substantially horizontal distribution devices. In most cases involving reacting fluids flowing through fixed beds of solids it will be preferred to employ the embodiment shown in FIG. 1 as this is most compatible with the distribution trays necessary to disperse the liquid and vapor across the next solids bed.

The deflector surface 40 may be freely supported beneath the bottom plate 33 or may coincide with a first, rough distributor tray 46 which acts to reduce the momentum of the fluids exiting the mixing section and convey liquid and vapor to a final distributor 48 for dispersion across the next solids bed. The distributor trays are preferably chimney trays consisting of a plurality of upstanding tubular conduits 48 having apertures 49 for vapor and liquid entry above the tray and one or more outlet ports below the tray. Most preferably the chimneys are designed to create high shear between the gas and liquid phases, atomize the liquid, and disperse the liquid droplets in a wide spray across the solids bed immediately below the final distributor tray 50.

The present invention provides improved mixing of vapor and liquid between catalyst beds. In addition, the present invention is compact, utilizing space between the grid supports for the vapor mixing chamber, and takes up relatively little height in a reactor column as compared to other distribution systems which may provide a similar degree of vapor and liquid mixing. Further, the present invention requires less pressure drop than other distribution systems which contact the vapor and liquid at the start of the mixing process because the liquid is not accelerated to the velocity of the vapor until very late in the contacting process. Furthermore, the invention as shown in FIG. 1 is relatively insensitive to tolerance variations introduced during fabrication and provides superior uniformity of distribution and vapor/liquid contact during operation under varying conditions. The invention may be used without quench injection to provide improved liquid mixing and vapor mixing, as well as liquid and vapor redistribution, in a long solids bed.

Figure 2:
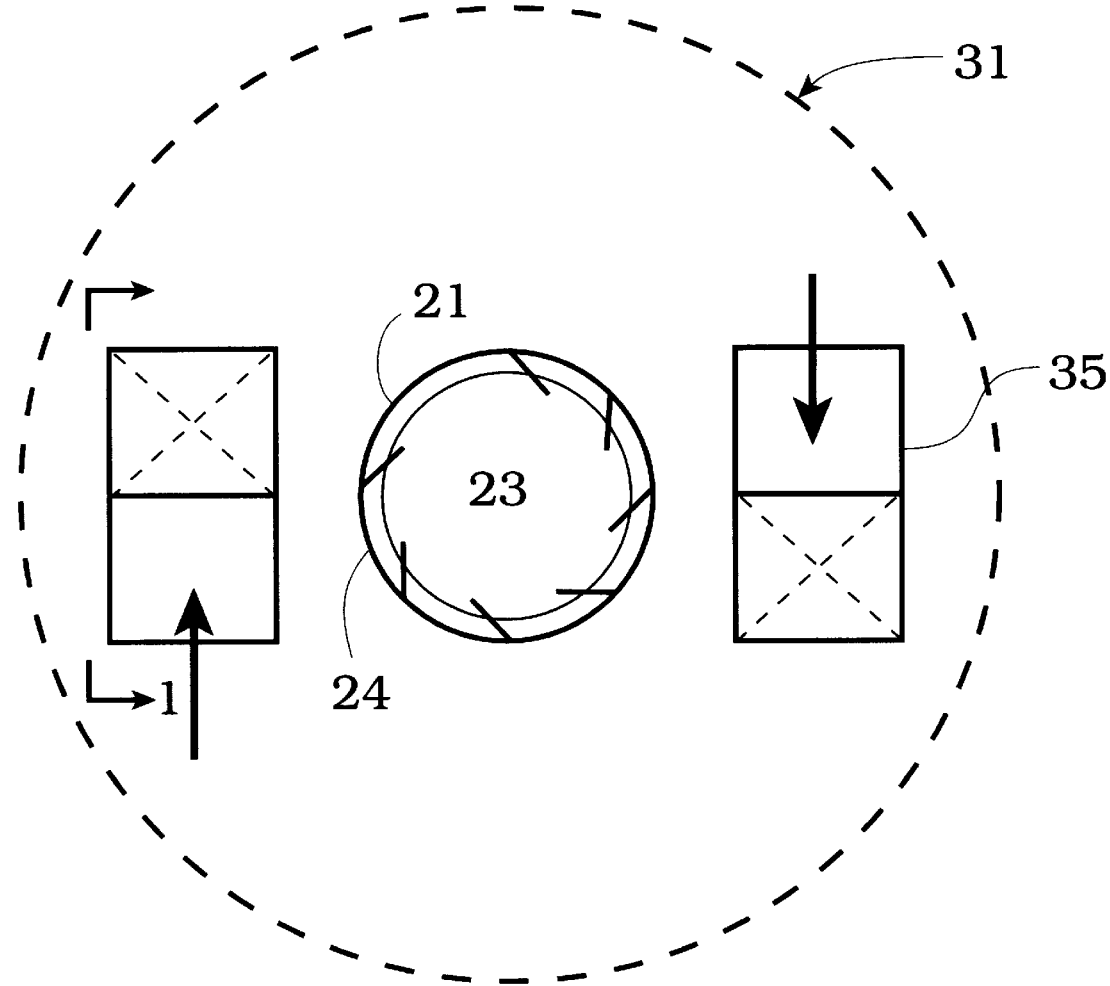
FIG. 2 is a plan view which depicts a vapor-liquid mixing system. The spillways into the liquid mixing chamber, as well as the vapor mixing chamber with vanes, are clearly visible.
Figure 3:
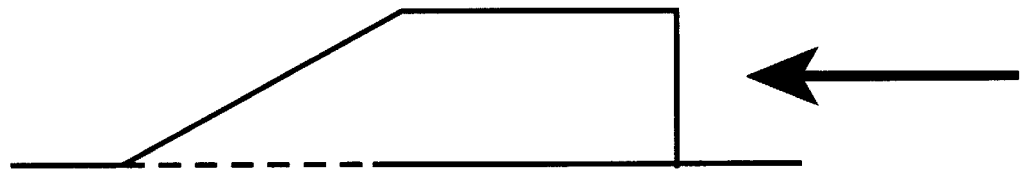
FIG. 3 is a cross-sectional view of one of the spillways.

FIG. 2 is a plan view of the mixing system. It illustrates the vapor mixing chamber 20, with vanes 51 which are spaced to create entrance ports 24. Each entrance port 24 is defined by two vanes 51 extending outwardly from the surface of the first cylindrical baffle 21, each vane 51 forming approximately the same angle (up to 60 degrees, and preferably up to 45 degrees) with respect to a tangent at the point where a plane through the vane 51 would contact the first cylindrical baffle 21 as every other vane 51 to a tangent similarly drawn, each vane 51 spaced from each other to define entrance ports 24 there between. A spillway 35 is visible on either side of the vapor mixing chamber 20. FIG. 3 is a cross-section of a spillway 35 which illustrates the manner in which the liquid flows into the liquid mixing chamber 30.

Figure 4:
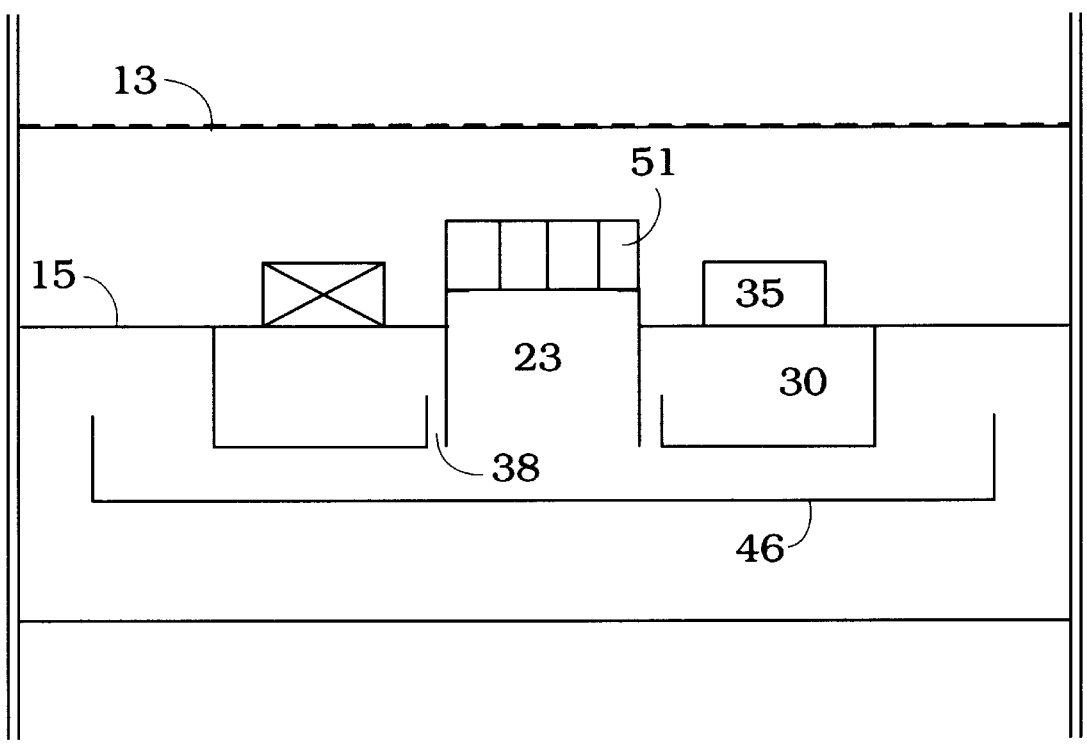
FIG. 4 is an elevation view of the vapor-liquid mixing system, showing the vapor mixing chamber and the liquid mixing chamber positioned below the catalyst bed.

FIG. 4 is an elevation view of a multiple-bed downflow reactor, similar to that of FIG. 1, but further simplified. It illustrates the entrance vanes 51 to the vapor mixing chamber 20. Also illustrated are the catalyst bed 13, the collection tray 15, and the spillways 35. The liquid mixing chamber 30 possesses a restricted outlet 38 through which liquid flows to mix with vapor above rough distributor tray 46. Also illustrated is the final distributor tray 50.

DESCRIPTION OF DATA

Cold flow studies were conducted to evaluate the performance of the present invention as well as prior art. A full-scale model of a fuels hydrocracker interbed assembly was constructed with walls fabricated from clear acrylic to aid in flow pattern observation. Being identical in all dimensions to a commercial reactor interbed assembly, the model tested not only mixing performance at full flow rates but also the fit and installation of new hardware. The model featured a vapor distributor and liquid distributor to introduce fluids uniformly into the model, a perforated deck representing the solids support grid, and a full interbed assembly consisting of a collector tray, mixing section, rough distributor tray, and final distributor tray, as well as simulated thermowell tubes and quench pipes. Pressure gauges, flow meters, and liquid and gas samplers allowed all relevant fluid mechanical variables to be measured.

Liquid and gas flowed downwardly through the interbed mixing system. Water and air were used to simulate process liquid and gas. Test rates were chosen to simulate operating ranges of most fuels hydrocrackers by matching the appropriate fluid mechanical quantities. The fluid translation basis used in the experiments has been well-established by close agreement between cold flow test results and commercial performance for many devices developed for petroleum refining applications.

For mixing experiments a tracer amounting to less than 2 volume percent of the total flow was injected into each phase in the mixing system. Gas and liquid samples from eight equally-spaced outlets were analyzed for tracer concentration. Using the individual tracer concentrations for each phase, the standard deviation of tracer concentration was calculated and expressed as a fraction of the mean concentration. The difference of this value from unity, multiplied by 100, is the mixing index. The mixing index is a measure of the degree of mixing occurring in the interbed system. Perfect mixing would be denoted by a mixing index of 100, i.e. all samples have the same tracer concentration. High mixing indices correspond to good mixing and low indices to poor mixing.

Pressure drop and liquid level on all decks were measured. The fluid translation used in the experiments results in pressure drop and liquid level identical to those in the commercial reactor at the corresponding conditions. Comparison of cold flow model and commercial reactor pressures drops confirmed this fact.

From cold flow mixing experiments the interbed mixing system of prior art showed good transverse liquid mixing but limited transverse gas mixing particularly at high flow rates. The present invention improved gas mixing by 60 index numbers and improved liquid mixing by 5 numbers. In the test case, pressure drop across the interbed assembly was 40% lower than hardware of prior art. The hardware of the present invention was installed easily within the restrictive height constraints of the interbed assembly.

We claim:

1. A mixing zone for a reactor column said mixing zone comprising:
    (a) a horizontal divider plate extending radially across a reactor column, said divider plate having an upper surface and a lower surface and having an opening therethrough;
    (b) a first cylindrical baffle mounted on said upper surface of said divider plate and encircling said opening through said divider plate, said cylindrical baffle having a plurality of entrance ports located along the circumference of said cylindrical baffle and defined by vanes, wherein each entrance port is defined by two vanes extending outwardly from the surface of said first cylindrical baffle, each of said vanes forming approximately the same angle with respect to a tangent at the point where a plane through the vane would contact said first cylindrical baffle as every other vane to a tangent similarly drawn, said vanes spaced from each other to define entrance ports there between, wherein the lower edges of said entrance ports are raised above said divider plate;

(c) a cover plate extending radially across the top of said first cylindrical baffle to thereby prevent substantially downward flow in or out of the top of said first cylindrical baffle;

(d) a second cylindrical baffle mounted on the lower surface of said divider plate, and together with said first cylindrical baffle defining a first cylindrical volume in which the effective radius may vary over the height of said first cylindrical volume;

(e) a third cylindrical baffle mounted on the lower surface of said divider plate;

(f) a horizontal bottom plate extending radially inward from the bottom edge of said third cylindrical baffle, said bottom plate having an upper surface and a lower surface and having a opening therethrough;

(g) a fourth cylindrical baffle mounted on or above said upper surface of said bottom plate inside said third cylindrical baffle, and together with said third cylindrical baffle and said bottom plate defining a second cylindrical volume in which the effective radius may vary over the height of said second cylindrical volume, said second cylindrical volume being distinct and non-overlapping with said first cylindrical volume;

(h) at least one spillway through said divider plate having an approach conduit above said divider plate and a fluid passage through said divider plate, said approach conduit and said fluid passage together providing a liquid flow path from above said divider plate into said second cylindrical volume in a direction which is tangential relative to said third cylindrical baffle and at a minimal downward angle into said second cylindrical volume, and further wherein said approach conduit does not project into said second cylindrical volume, so as to create rotational flow in said second cylindrical volume;

(i) at least one flow restriction means in said fourth cylindrical baffle and/or formed by the relative positions of at least two of said fourth cylindrical baffle, said second cylindrical baffle, said divider plate, and said bottom plate, said flow restriction means having a cross-sectional area less than or equal to the total area of said spillway fluid passages through said divider plate and providing a flow path for liquid out of said second cylindrical volume.

2. A method of mixing vapor and liquid reactants in a reactor column, the method comprising:

(a) flowing vapor and liquid reactants vertically downwardly into a mixing zone within a reactor column;

(b) separating said vapor reactant from said liquid reactant;

(c) flowing said vapor reactant into a vapor mixing chamber which imparts a swirling action thereto;

(d) flowing said liquid reactant into a liquid mixing chamber which imparts a swirling action thereto; and wherein said vapor mixing chamber is distinct and nonoverlapping with said liquid mixing chamber;

(e) flowing said vapor reactant into said liquid reactant in a manner which favors atomization of said liquid into said vapor to form a two-phase mixture.

3. The method according to claim 2 wherein said vapor mixing chamber is substantially circular and wherein said vapor reactant enters tangentially into said vapor mixing chamber.

4. The method according to claim 2 wherein said liquid mixing chamber is substantially circular and wherein said liquid reactant enters tangentially into said liquid mixing chamber.

5. The method according to claim 2 wherein said liquid mixing chamber is substantially circular, said vapor mixing chamber is substantially circular, wherein at least a portion of said vapor mixing chamber is located concentrically within at least a portion of said liquid mixing chamber, wherein said liquid exits said liquid mixing chamber in a thin sheet which surrounds said vapor exiting said vapor mixing chamber, and wherein said vapor exiting said vapor mixing chamber is directed in a manner to force said vapor through said liquid sheet.

6. The method according to claim 5 wherein an auxiliary vapor stream is introduced into said vapor reactant on or above said divider plate upstream of said vapor mixing chamber.

7. The method according to claim 5 wherein an auxiliary vapor stream is introduced directly into said vapor mixing chamber.

8. The method according to claim 5 wherein an auxiliary liquid stream is introduced into said liquid reactant on or above said divider plate upstream of said liquid mixing chamber.

9. The method according to claim 5 wherein an auxiliary liquid stream is introduced directly into said liquid mixing chamber.

10. The method according to claim 5 wherein an auxiliary vapor or liquid stream is introduced at or immediately following the point of contact between said liquid reactant and said vapor reactant.

* * * * *